| United States Patent [19] | [11] | 4,431,770 |
|---|---|---|
| East et al. | [45] | Feb. 14, 1984 |

[54] WHOLLY AROMATIC POLYESTER COMPRISING 4-OXY-4'-CARBOXYBIPHENYL MOIETY WHICH IS CAPABLE OF FORMING AN ANISOTROPIC MELT PHASE

[75] Inventors: Anthony J. East, Madison; Gordon W. Calundann, North Plainfield, both of N.J.

[73] Assignee: Celanese Corporation, New York, N.Y.

[21] Appl. No.: 490,648

[22] Filed: May 2, 1983

Related U.S. Application Data

[63] Continuation-in-part of Ser. No. 402,882, Jul. 29, 1982, abandoned.

[51] Int. Cl.$^3$ ..................... C08G 63/06; C08G 63/60
[52] U.S. Cl. ..................... 524/599; 524/601; 524/604; 524/605; 528/173; 528/190; 528/191; 528/206; 528/271
[58] Field of Search .............. 528/190, 206, 271, 191, 528/173; 524/599, 601, 604, 605

[56] References Cited

U.S. PATENT DOCUMENTS

| 4,318,841 | 3/1982 | East et al. | 528/190 |
|---|---|---|---|
| 4,330,457 | 5/1982 | East et al. | 528/190 |
| 4,337,190 | 6/1982 | Calundann | 528/190 |
| 4,359,569 | 11/1982 | Siemionko | 528/190 |
| 4,393,191 | 7/1983 | East | 528/190 |
| 4,395,513 | 7/1983 | Calundann | 528/190 |

*Primary Examiner*—Lester L. Lee
*Attorney, Agent, or Firm*—Burns, Doane, Swecker & Mathis

[57] ABSTRACT

A novel wholly aromatic polyester is provided which contains specified concentrations of 6-oxy-2-naphthoyl and 4-oxy-4'-carboxybiphenyl moieties and which may optionally possess ring substitution (as described) upon such moieties. It has been found that the wholly aromatic polyester of the present invention is capable of exhibiting an anisotropic melt phase which is readily melt processable to form quality fibers, films, molded articles, etc. The color characteristics of the new polymer are excellent (i.e. the polymer is of a white or pale coloration). Additionally, since the new wholly aromatic polyester tends to incorporate a lesser number of ester units per unit weight it is expected to exhibit enhanced stability at elevated temperatures.

51 Claims, No Drawings

WHOLLY AROMATIC POLYESTER COMPRISING 4-OXY-4'-CARBOXYBIPHENYL MOIETY WHICH IS CAPABLE OF FORMING AN ANISOTROPIC MELT PHASE

CROSS-REFERENCE TO RELATED APPLICATION

This is a continuation-in-part of U.S. Ser. No. 402,882, filed July 29, 1982 (now abandoned).

BACKGROUND OF THE INVENTION

Wholly aromatic polyester resins have long been known. For instance, 4-hydroxybenzoic acid homopolymer and copolymers have been provided in the past and are commercially available. Such polymers commonly are crystalline in nature, relatively high melting or possess a decomposition temperature which is below the melting point, and when molten frequently exhibit an isotropic melt phase. Molding techniques such as compression molding or sintering may be utilized with such materials. Representative publications which discuss these wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 and 63 (July 1975), and (d) *Poly(p-Oxybenzoyl Systems): Homopolymer for Coatings: Copolymers for Compression and Injection Molding*, by Roger S. Storm and Steve G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,662,052; 3,668,300; 3,723,388; 3,759,870; 3,767,621; 3,773,858; 3,787,370; 3,790,528; 3,829,406; 3,857,814; 3,884,876; 3,890,256; 3,974,250; and 3,975,487; and U.K. patent application No. 2,058,102A.

It has been disclosed that certain polyesters may be formed which exhibit melt anisotropy. See, for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics Composites Institute, The Society of the Plastics Industry, Inc., Section 17-D, Pages 1-4, (b) Belgian Patent Nos. 828,935 and 828,936, (c) Dutch Pat. No. 7505551, (d) West German Pat. Nos. 2520819, 2520820, 2722120, 2834535, 2834536 and 2834537, (e) Japanese Nos. 43-223; 2132-116; 3017-692; and 3021-293; (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,272,625; 4,279,803; 4,285,852; 4,287,332; 4,294,955; 4,299,756; 4,314,073; 4,318,841; 4,318,842; 4,332,759; 4,337,191; 4,339,375; and 4,341,688; and (g) U.K. Application No. 2,002,404.

Representative disclosures of anisotropic melt forming polyesters, poly(ester-amides), or poly(ester-carbonates) which may include 6-oxy-2-naphthoyl moiety are present in U.S. Pat. Nos. 4,161,470; 4,219,461; 4,256,624; 4,279,803; 4,299,756; 4,318,841; 4,318,842; 4,330,457; 4,337,190; 4,347,349; 4,351,917; 4,351,918; 4,355,133; 4,359,569; 4,362,777; 4,370,466; and 4,371,660.

A polyester which may incorporate a 4-oxy-4'-carboxybiphenol moiety is mentioned in U.S. Pat. No. 3,975,487.

It is an object of the present invention to provide a novel wholly aromatic polyester capable of forming an optically anisotropic melt phase which is derived from a combination of moieties wich include 6-oxy-2-naphthoyl and 4-oxy-4'-carboxybiphenyl moieties and which may optionally possess ring substitution (as described) upon such moieties.

It is an object of the present invention to provide a novel wholly aromatic polyester which is capable of forming an optically anisotropic melt phase, and which may readily be melt processed to form quality fibers, films, three-dimensional molded articles, etc.

It is an object of the present invention to provide a novel wholly aromatic polyester which is capable of forming shaped articles which exhibit highly satisfactory physical properties.

It is an object of the present invention to provide a novel wholly aromatic polyester which exhibits excellent color characteristics and the polymer is commonly of a white or pale coloration.

It is an object of the present invention to provide a novel wholly aromatic polyester which tends to incorporate a lesser number of ester units per unit weight which is expected to contribute to its stability at elevated temperatures.

These and other objects, as well as the scope, nature and utilization of the claimed invention will be apparent to those skilled in the art from the following detailed description and appended claims.

SUMMARY OF THE INVENTION

It has been found that a melt processable wholly aromatic polyester which is capable of forming an anisotropic melt phase at a temperature below 350° C. consists essentially of moieties I and II and optionally also including moiety III and/or moieties IV and V which may include substitution of at least some of the hydrogen atoms present upon an aromatic ring wherein:

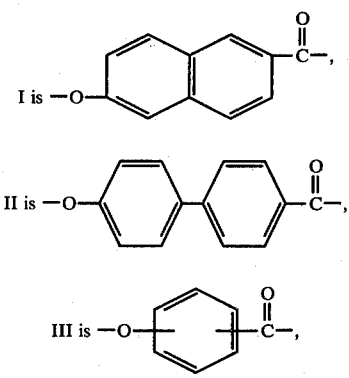

wherein the bonds illustrated are meta and/or para disposed,

IV is a dioxyaryl moiety of the formula —O—Ar—O— where Ar is a divalent radical comprising at least one aromatic ring, and V is a dicarboxyaryl moiety of the formula

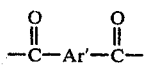

where Ar' is a divalent radical comprising at least one aromatic ring, and with the optional substitution is present being selected from the group consisting of an alkyl group of 1 to 4 carbon atoms, an alkoxy group of 1 to 4 carbon atoms, halogen, phenyl, and mixtures of the foregoing, and wherein moiety I is present in the wholly aromatic polyester in a concentration of approximately 4 to 65 mole percent, moiety II is present in a concentration of 20 to 65 mole percent, moiety III is present in a concentration of 0 to approximately 65 mole percent, and moiety IV is present in a concentration of 0 to approximately 25 mole percent, and moiety V is present in a concentration of 0 to approximately 25 mole percent, with the proviso that the total molar concentration of moieties I and II in the wholly aromatic polyester is approximately 50 to 100 mole percent.

DESCRIPTION OF PREFERRED EMBODIMENTS

The melt processable wholly aromatic polyester of the present invention consists essentially of at least two recurring moieties which when combined in the polyester have been found to form an atypical anisotropic melt phase at a temperature below approximately 350° C., and preferably below approximately 325° C. The polymer melting temperature may be confirmed by the use of a differential scanning calorimeter (i.e. DSC) employing repeat scans at a 20° C. per minute heat-up rate and observing the peak of the DSC melt transition. The wholly aromatic polyester of the present invention commonly exhibits a melting temperature in the range of approximately 250° to 345° C. as determined by differential scanning calorimetry. Because of its ability to exhibit anisotropic properties (i.e. liquid crystalline properties) in the melt, the polyester readily can form a product having a highly oriented molecular structure upon melt processing. Preferred polyesters are capable of undergoing melt processing at a temperature in the range of approximately 250° to 380° C. The usual difficulties incurred when one attempts to melt process many aromatic polyesters by conventional melt processing techniques effectively are eliminated. The polyester of the present invention is considered to be "wholly" aromatic in the sense that each moiety present in the same contributes at least one aromatic ring to the polymer backbone.

The first essential unit (i.e. moiety I) of the polyester of the present invention is a 6-oxy-2-naphthoyl moiety of the structural formula:

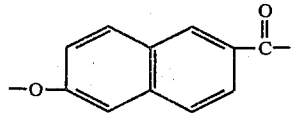

While not specifically illustrated in the structural formula, at least some of the hydrogen atoms present upon the aromatic rings of moiety I can be substituted. Such optional substitution may be an alkyl group of 1 to 4 carbon atoms, an alkoxy group of 1 to 4 carbon atoms, halogen (e.g. Cl, Br, I), phenyl, and mixtures of the foregoing. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-4,7-dichloro-2-naphthoic acid, 6-hydroxy-5-phenyl-2-naphthoic acid, etc. The presence of ring substitution tends to modify to some degree the physical properties of the resulting polymer (e.g. the polymer may soften at a lower temperature, its impact strength may be improved, and the crystallinity of the solid polymer may be decreased). In a preferred embodiment wherein a polyester of optimum crystallinity in the solid state is desired, no ring substitution is present.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. U.S. Pat. No. 1,593,816 is concerned with a process for synthesizing 6-hydroxy-2-naphthoic acid by reacting carbon dioxide with the potassium salt of betanaphthol. See also U.S. Pat. Nos. 4,287,357; 4,329,424; 4,345,094; and 4,345,095.

Moiety I comprises approximately 4 to 65 mole percent of the wholly aromatic polyester. In a preferred embodiment moiety I is present in a concentration of approximately 20 to 60 mole percent. In a particularly preferred embodiment moiety I is present in a concentration of approximately 35 to 65 mole percent (e.g. in a concentration of approximately 40 to 60 mole percent).

The second essential unit (i.e. Moiety II) of the polyester of the present invention is a 4-oxy-4'-carboxybiphenyl moiety of the structural formula:

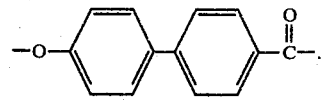

While not specifically illustrated in the structural formula, at least some of the hydrogen atoms present upon the aromatic rings of moiety II can be substituted. Such optional substitution can be as described in connection with moiety I. In a preferred embodiment wherein a polyester of optimum crystallinity in the solid state is desired, no ring substitution is present.

As will be apparent to those skilled in the art, moiety II can be derived from 4-hydroxy-4'-carboxybiphenyl (i.e. 4-hydroxybiphenyl-4'-carboxylic acid). The 4-hydroxy-4'-carboxybiphenyl can be formed in accordance with known techniques. For instance, 4-methoxy-4'-carboxybiphenyl may be formed in accordance with the procedure of Johnson et al, *J. American Chem. Soc.*, 68, 1649 (1946), and this compound can be demethylated to form the 4-hydroxy-4'-carboxybiphenyl in accordance with the procedure of Gray et al, *J. Chem. Soc.*, 1418 (1955). Alternatively, 4-hydroxy-4'-iodobiphenyl may be synthesized by direct iodination of the acetate, benzoate or benzenesulfonate esters of 4-hydroxybiphenyl according to the method of Schmidt, Savoy and Abernethy, *J. Amer. Chem. Soc.*, 1944, (66), pages 491 to 494. The iodo compound may then be converted to 4-hydroxy-4'-cyanobiphenyl by reaction with cuprous cyanide by the method of Bach, Barclay, Kende and Cohen, *J. Medical Chem.*, 1968, (11), page 992. Also, the nitrile may be hydrolyzed to the hydroxyacid with a strong aqueous alkali in accordance with known techniques.

Moiety II comprises approximately 20 to 65 mole percent of the wholly aromatic polyester (e.g. approximately 20 to 60 mole percent). In a preferred embodiment moiety II is present in a concentration of approximately 35 to 65 mole percent (e.g. in a concentration of approximately 40 to 60 mole percent). The total molar concentration of moieties I and II in the wholly aromatic polyester of the present invention is approximately 50 to 100 mole percent (e.g. is a concentration of approximately 50 to 90 mole percent).

Moiety III is optionally present in the wholly aromatic polyester of the present invention and is of the structural formula:

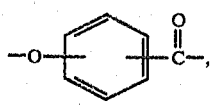

wherein the bonds illustrated are meta and/or para disposed. Accordingly, moiety III can be termed a m-oxybenzoyl moiety or a p-oxybenzoyl moiety. In a preferred embodiment the bonds of moiety III are para disposed. While not specifically illustrated in the structural formula, at least some of the hydrogen atoms present upon the aromatic rings of moiety III optionally can be substituted. Such optional substitution can be as described in connection with moiety I.

As will be apparent to those skilled in the art, moiety III can be derived from m-hydroxybenzoic acid and/or p-hydroxybenzoic acid. Representative examples of ring substituted compounds from which moiety III can be derived include 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 2-phenyl-4-hydroxybenzoic acid, 3-phenyl-4-hydroxybenzoic acid, etc. The presence of ring substitution in moiety II tends to modify to some degree the physical properties of the resulting polymer as previously described in connection with moiety I. In a preferred embodiment wherein a polyester of optimum crystallinity in the solid state is desired, no ring substitution is present.

Moiety III comprises approximately 0 to 65 mole percent of the wholly aromatic polyester (e.g. approximately 0 to 40 mole percent), and when present is preferably incorporated in the wholly aromatic polyester in a concentration of approximately 10 to 40 mole percent (e.g. in a concentration of approximately 15 to 40 mole percent).

Moieties IV and V optionally can also be present with or without the concomitant presence of moiety III. Moiety IV is a dioxyaryl moiety of the formula —O—Ar—O— where Ar is a divalent radical comprising at least one aromatic ring. Moiety IV preferably is symmetrical in the sense that the divalent bonds which join the moiety to other moieties in the main polymer chain are symmetrically disposed on one or more aromatic rings (e.g. are para to each other or are diagonally disposed when present on a naphthalene ring). Preferred moieties which may serve as moiety IV include:

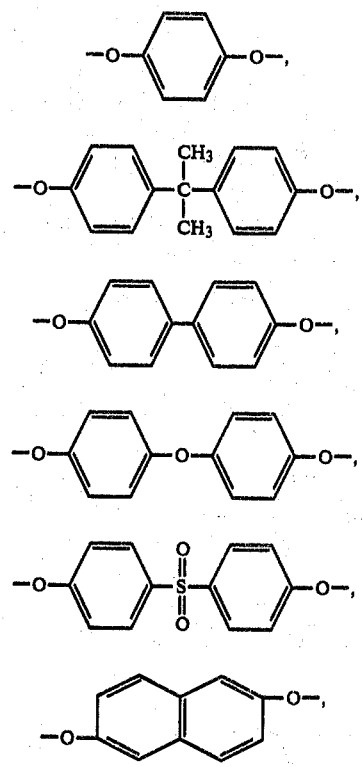

and mixtures of the foregoing. The particularly preferred dioxyaryl moiety which serves as moiety IV is hydroquinone. At least some of the hydrogen atoms present upon aromatic rings of moiety IV optionally can be substituted. Such optional substitution can be as described in connection with moiety I. In a preferred embodiment wherein a polyester of optimum crystallinity in the solid state is desired, no ring substitution is present. Representative examples of ring substituted compounds from which moiety IV can be derived include methyl hydroquinone, chlorohydroquinone, bromohydroquinone, phenylhydroquinone, etc. An example of a non-symmetrical dioxyaryl moiety of moiety IV is that derived from resorcinol.

Moiety IV comprises approximately 0 to 25 mole percent of the wholly aromatic polyester, and when present is preferably incorporated in the wholly aromatic polyester in a concentration of approximately 15 to 25 mole percent.

Moiety V is a dicarboxyaryl moiety of the formula

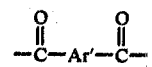

where Ar' is a divalent radical comprising at least one aromatic ring. Moiety V preferably is symmetrical in the sense that the divalent bonds which join the moiety to other moieties in the main polymer chain are symmetrically disposed on one or more aromatic rings (e.g. are para to each other or are diagonally disposed when present on a naphthalene ring). Preferred moieties which may serve as moiety V include:

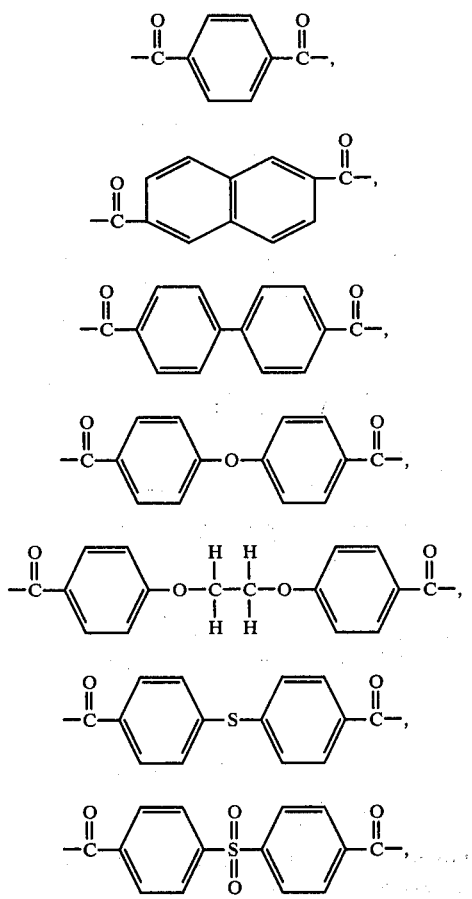

and mixtures of the foregoing. The particularly preferred dicarboxyaryl moiety which serves as moiety V is a terephthaloyl moiety which can be derived from terephthalic acid. At least some of the hydrogen atoms present upon aromatic rings optionally can be substituted. Such optional substitution can be as described in connection with moiety I. In a preferred embodiment wherein a polyester of optimum crystallinity in the solid state is desired, no ring substitution is present. An example of a non-symmetrical dicarboxyaryl moiety of moiety V is that derived from isophthalic acid.

Moiety V comprises approximately 0 to 25 mole percent of the wholly aromatic polyester, and when present is preferably incorporated in the wholly aromatic polyester in a concentration of approximately 15 to 25 mole percent.

If phenyl substitution is present on any of moieties I, II, III, IV, or V, such phenyl groups also may optionally bear common groups such as those which may replace hydrogen atoms upon the aromatic rings. For instance, such substitution may be an alkyl group of 1 to 4 carbon atoms, an alkoxy group of 1 to 4 carbon atoms, or halogen (e.g. Cl, Br, I).

Minor concentrations (e.g. 10 mole percent or less) of arylhydroxy acids other than those of moieties I, II, and III optionally may be included in the wholly aromatic polyester of the present invention so long as such moieties do not raise the melting temperature of the resulting polymer above that specified, or do not otherwise interfere with the exhibition of the desired anisotropic properties in the melt (described hereafter).

The wholly aromatic polyester of the present invention commonly exhibits

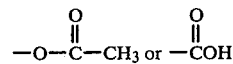

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

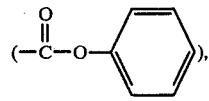

and methylester

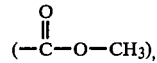

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The polyester of the present invention tends to be substantially insoluble in all common polyester solvents, such as hexafluoroisopropanol and o-chlorophenol, and accordingly is not susceptible to solution processing. It can surprisingly be readily processed by common melt processing techniques as discussed hereafter. Most compositions are soluble in pentafluorophenol.

The wholly aromatic polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in a pentafluorophenol solution may be employed to determine the molecular weight.

The wholly aromatic polyester prior to heat treatment additionally commonly exhibits an inherent viscosity (i.e., I.V.) of at least 4 (e.g., approximately 4 to 15) when dissolved in a concentration of 0.1 percent by weight in pentafluorophenol at 60° C. In some embodiments the resulting wholly aromatic polyester is not sufficiently soluble in pentafluorophenol for such inherent viscosity determination to be made.

The wholly aromatic polyester of the present invention commonly may be considered crystalline in the sense that fibers melt extruded therefrom exhibit x-ray diffraction patterns using Ni-filtered CuKα radiation and flat plate cameras characteristic of polymeric crystalline materials. In spite of the crystallinity commonly observed, the wholly aromatic polyester of the present invention nevertheless may be easily melt processed in all instances.

Unlike the aromatic polyesters commonly encountered in much of the prior art, the wholly aromatic polyester of the present invention is not intractable and forms an anisotropic melt phase whereby an atypical degree of order is manifest in the molten polymer. The subject wholly aromatic polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow), however, the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a largely melt solution of the reactants wherein some reactants such as terephthalic acid initially are present as solids. The polymer product is suspended therein as solid polymer particles. A vacuum may be applied to facilitate removal of volatiles formed during the final stage of the condensation (e.g., acetic acid or water).

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which moieties I, II, III, and IV are derived may be initially provided in a modified form whereby the hydroxyl groups of these monomers are esterified (i.e., they are provided as acyl esters). The lower acyl groups preferably have from about 2 to about 4 carbon atoms. Preferably the acetate esters of the organic compounds which form moieties I, II, III and IV are provided. Accordingly, particularly preferred reactants for the condensation reaction are 6-acetoxy-2-naphthoic acid, 4-acetoxy-4'-carboxybiphenyl, 4-acetoxybenzoic acid, and hydroquinone diacetate.

Representative catalysts which optionally may be employed in either the melt acidolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed polyester may be further increased via a solid state polymerization procedure wherein the particulate polymer is heated in an inert atmosphere (e.g. in a nitrogen atmosphere) at a temperature of about 240° C. for 10 to 12 hours.

The wholly aromatic polyester of the present invention exhibits excellent color characteristics and is of either a white or pale coloration. Since the polyester tends to incorporate a lesser number of ester units per unit weight, it is expected to exhibit enhanced stability at elevated temperatures.

The wholly aromatic polyester of the present invention readily can be melt processed to form a variety of relatively stiff shaped articles, e.g., molded three-dimensional articles, fibers, films, tapes, etc. The polyester of the present invention is suited for molding applications and may be molded via standard injection molding techniques commonly utilized when forming molded articles. Unlike the polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the wholly aromatic polyester of the present invention which incorporates approximately 1 to 60 percent by weight of a solid filler (e.g. talc) and/or reinforcing agent (e.g. glass fibers).

The wholly aromatic polyester of the present invention also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e. a slit die) when forming a polymeric film. When forming a filamentary material, the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 70 mils (e.g., 5 to 40 mils) may be utilized. Yarns of about 20 to 200 continuous filaments are commonly formed. The melt-spinnable polyester is supplied to the extrusion orifice at a temperature above its melting point, e.g., a temperature of about 250° to 380° C.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have denier per filament of about 1 to 50, and preferably a denier filament of about 1 to 20.

The resulting filamentary material or film optionally may be subjected to a thermal treatment whereby its physical properties are further enhanced. The tenacity of the fiber or film may be increased by such thermal treatment. More specifically, the fibers or films may be thermally treated in an inert atmosphere (e.g., nitrogen, argon, helium) or in a flowing oxygen-containing atmosphere (e.g. air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for 8 hours and at 280° C. for 2 hours. Alternatively, the fiber may be heated at about 15° to 20° C. below the temperature at which it melts for about 24 hours. Optimum heat treatment conditions will vary with the specific composition of the polyester and with the fiber's process history.

The as-spun fibers formed from the polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), and an average single filament tensile modulus of at least about 300 grams per denier (e.g., about 300 to 1000 grams per denier), and exhibit an extraordinary dimensional stability at elevated temperatures (e.g., at temperatures of about 150° to 200° C.). Such properties enable the fibers to be used with particular advantage as tire cords and in other industrial applications, such as conveyor belts, hose, cabling, resin reinforcement, etc. Films formed of the polyester of the present invention may be used as strapping tape, cable wrap, magnetic tape, electric motor dielectric film, etc. The fibers and films exhibit an inherent resistance to burning.

The following examples are presented as specific illustrations of the claimed invention. It should be understood, however, that the invention is not limited to the specific details set forth in the examples.

EXAMPLE 1

To a 300 ml. three-neck round bottom flask equipped with a sealed paddle stirrer, gas inlet tube, and a distillation head connected to a condenser were added the following:

(a) 23.0 grams of 6-acetoxy-2-naphthoic acid (0.1 mole), and
(b) 25.6 grams of 4-acetoxy-4'-carboxybiphenyl (0.1 mole).

The flask was thoroughly purged of oxygen by evacuation and refilling with dry argon three times, and was then heated in an oil bath under a slow stream of argon.

While stirring continued the contents of the flask were heated to 280° C. After heating for 45 minutes at 280° C., 7 ml. of acetic acid had been collected, and the temperature was raised to 300° C. After heating continued for 45 minutes at 300° C., the temperature was raised to 320° C. and was held there for 10 minutes. When 8.5 ml. of acetic acid had been collected the melt began to assume an opalescent appearance. A viscous opaque pearly melt was formed. The melt was next heated at 340° C. for 45 minutes, and at 350° C. for 25 minutes, and was finally evacuated to 0.5 mm. Hg at 360° C. for 15 minutes. A total of 10 ml. of acetic acid was collected. The vacuum was released with dry argon, and the contents of the flask were allowed to cool.

The resulting polymer was a pale fawn color, was largely insoluble in pentafluorophenol at 60° C., exhibited a melt endotherm of 337° C. when subjected to differential scanning calorimetry (20° C./min. heating rate), and exhibited an anisotropic melt phase.

EXAMPLE 2

Example 1 was substantially repeated with the exception that a higher molar concentration of moiety I and a lower molar concentration of moiety II were utilized. More specifically, the following reactants were added to the flask:

(a) 20.7 grams of 6-acetoxy-2-naphthoic acid (0.09 mole), and
(b) 15.36 grams of 4-acetoxy-4'-carboxybiphenyl (0.06 mole). The contents of the flask were heated at 280° C. for 45 minutes, at 300° C. for 45 minutes, at 320° C. for 45 minutes, at 340° C. for 20 minutes, at 350° C. for 30 minutes, and were finally heated at 360° C. for 40 minutes while at 0.5 mm. of Hg. The resulting wholly aromatic polyester was largely insoluble in pentafluorophenol at 60° C., exhibited a melting temperature of approximately 317° C., and exhibited an anisotropic melt phase.

EXAMPLE 3

To a 300 ml. three-neck round bottom flask equipped with a sealed paddle stirrer, gas inlet tube, and a distillation head connected to a condenser were added the following:

(a) 23.0 grams of 6-acetoxy-2-naphthoic acid (0.1 mole),
(b) 25.6 grams of 4-acetoxy-4'-carboxybiphenyl (0.1 mole), and
(c) 18.0 grams of 4-acetoxybenzoic acid (0.1 mole). Following purging and evacuating with dry argon, the flask was heated in an oil bath under a slow stream of argon.

While stirring continued, the contents of the flask were heated to 250° C., were maintained at 250° C. for 45 minutes, were heated to 280° C., were maintained at 280° C. for 45 minutes, were heated to 300° C., were maintained at 300° C. for 45 minutes, were heated to 320° C., were maintained at 320° C. for 30 minutes, were heated to 340° C., were maintained at 340° C. for 15 minutes, and finally the flask was evacuated to 0.5 mm. of Hg. at 340° C. for 45 minutes. The total yield of acetic acid was 13.8 ml.

The resulting molten polymer possessed a creamy appearance and was opaque. When stirred the polymer assumed an opalescent appearance. The polymer was cooled under argon, was removed from the flask, and was milled to powder form.

The inherent viscosity (I.V.) of the polymer was approximately 5.2 as determined in a pentafluorophenol solution of 0.1 percent by weight concentration at 60° C. in accordance with the equation:

$$I.V = \frac{\ln(\eta \text{ rel})}{c}$$

where c=concentration of solution (0.1 percent by weight), and $\eta$ rel=relative viscosity. When the polymer was subjected to differential scanning calorimetry (20° C./min. heating rate), it exhibited a melt endotherm at 257° C. The polymer melt was optically anisotropic.

The polymer was dried in a vacuum oven, and while molten and at a temperature of 307° C. was extruded through a single hole spinneret having a diameter of 0.007 inch at a throughput rate of 0.42 gram/minute. The as-spun filament was quenched in ambient air (i.e. at 72° F. and 65 percent relative humidity) prior to windup at a speed of 1460 meters/minute.

A section of the resulting as-spun polyester fiber had a denier of 2.74 and exhibited the following single filament properties:

Tenacity (grams per denier) 11.0,
Tensile modulus (grams per denier) 690,
Elongation (percent) 2.4.

For comparative purposes Example 3 was substantially repeated with the exception that moiety I (which was derived from 6-acetoxy-2-naphthoic acid) was omitted. Also, the final polymerization temperature was raised to 360° C. instead of 340° C. A total of 9.3 ml. of acetic acid were collected during the polymerization reaction. The resulting polymer exhibited a double melt endotherm at 333° C. and at 400° C., and was substantially insoluble in pentafluorophenol at 60° C. Unlike the polymer of Example 3, this comparative polymer which is outside the scope of the presently claimed invention, was intractable since it would not flow when heated at 400° C., and was incapable of undergoing melt spinning to form fibers.

EXAMPLE 4

Example 3 was substantially repeated while employing different molar concentrations of the reactants. More specifically, the following reactants were added to the flask:

(a) 27.6 grams of 6-acetoxy-2-naphthoic acid (0.12 mole),
(b) 30.7 grams of 4-acetoxy-4'-carboxybiphenyl (0.12 mole), and
(c) 28.8 grams of 4-acetoxybenzoic acid (0.16 mole).

Following purging and evacuating with dry argon, the flask was heated in an oil bath under a slow stream of argon.

While stirring continued, the contents of the flask were heated to 250° C., were maintained at 250° C. for 45 minutes, were heated to 280° C., were maintained at 280° C. for 45 minutes, were heated to 320° C., were maintained at 320° C. for 45 minutes. The yield of acetic acid was 20.3 ml. at this point. Finally, the contents of the flask while melt stirred were evacuated to 0.5 mm. of Hg and were heated at 340° C. for 30 minutes.

The resulting polymer was an opaque pale cream color, following extraction with acetone to remove low molecular weight impurities, exhibited an inherent viscosity of approximately 6.22 as determined in a pentafluorophenol solution of 0.1 percent by weight concentration at 60° C. and exhibited a sharp melt endotherm at 245° C. The molten polymer was anisotropic above 250° C.

The resulting polymer while at 287° C. was melt spun through a spinneret having a diameter of 0.007 inch at a throughput rate of 0.42 gram/minute and was wound up at a rate of 689 meters/minute.

A section of the resulting as-spun fiber had a denier of 5.1 and exhibited the following single filament properties:

Tenacity (grams per denier) 8.9,
Tensile modulus (grams per denier) 560,
Elongation (percent) 2.3.

EXAMPLE 5

Example 3 was substantially repeated while employing different molar concentrations of the reactants. More specifically, the following reactants were added to the flask:

(a) 27.6 grams of 6-acetoxy-2-naphthoic acid (0.12 mole),
(b) 40.1 grams of 4-acetoxy-4'-carboxybiphenyl (0.16 mole), and
(c) 21.6 grams of 4-acetoxybenzoic acid (0.12 mole).

Following purging and evacuating with dry argon, the flask was heating in an oil bath under a slow stream of argon.

While stirring continued, the contents of the flask were heated to 250° C., were maintained at 250° C. for 45 minutes, were heated to 300° C., were maintained at 300° C. for 30 minutes, were heated to 320° C., were maintained at 320° C. for 45 minutes. The yield of acetic acid was 22.0 ml. at this point. Finally the contents of the flask while melt stirred were evacuated to 0.6 mm. of Hg and heated at 340° to 360° C. for 60 minutes.

The resulting polymer was tan colored and opaque, exhibited an anisotropic melt phase, exhibited an inherent viscosity of approximately 12.5 as determined in a pentafluorophenol solution of 0.1 percent by weight concentration at 60° C., and exhibited a sharp melt endotherm at 270° C.

The resulting polymer while at 285° C. was melt spun through a spinneret having a diameter of 0.007 inch at a throughput rate of 0.14 gram/minute and was wound up at a rate of 312 meters/minute.

A section of the resulting as-spun fiber had a denier of 5.0 and exhibited the following single filament properties:

Tenacity (grams per denier) 7.2,
Tensile modulus (grams per denier) 532,
Elongation (percent) 1.8.

EXAMPLE 6

Example 3 was substantially repeated while employing different molar concentrations of the reactants. More specifically, the following reactants were added to the flask:

(a) 41.4 grams of 6-acetoxy-2-naphthoic acid (0.18 mole),
(b) 15.4 grams of 4-acetoxy-4'-carboxybiphenyl (0.06 mole), and
(c) 10.8 grams of 4-acetoxybenzoic acid (0.06 mole).

Following purging and evacuating with dry argon, the flask was heated in an oil bath under a slow stream of argon.

Polymerization was conducted at 250° to 340° C. over 3 hours. The yield of acetic acid was 16.0 ml. at this point. Finally the contents of the flask while melt stirred were evacuated to 0.4 mm. Hg and heated at 340° C. for 30 minutes.

The resulting polymer was tan colored and opaque, exhibited an anisotropic melt phase, exhibited an inherent viscosity of approximately 6.4 as determined in a pentafluorophenol solution of 0.1 percent by weight concentration at 60° C., and exhibited a melt endotherm at 286° C.

The resulting polymer while at 285° C. was melt spun at a throughput rate of 0.14 gram/minute and was wound up at a rate of 213 meters per minute.

A section of the resulting as-spun fiber had a denier of 4.2 and exhibited the following single filament properties:

Tenacity (grams per denier) 9.26,
Tensile modulus (grams per denier) 573,
Elongation (percent) 2.6.

EXAMPLE 7

Example 3 was substantially repeated while employing different molar concentrations of the reactants. More specifically, the following reactants were added to the flask:

(a) 17.3 grams of 6-acetoxy-2-naphthoic acid (0.075 mole),
(b) 38.4 grams of 4-acetoxy-4'-carboxybiphenyl (0.150 mole), and
(c) 13.5 grams of 4-acetoxybenzoic acid (0.075 mole).

Following purging and evacuating with dry argon, the flask was heated in an oil bath under a slow stream of argon.

Polymerization was conducted at 250° to 340° C. over 3 hours. Finally the contents of the flask while melt stirred were evacuated to 0.2 mm. Hg and heated at 340° C. for 30 minutes.

The resulting polymer was a pale cream color and opaque, exhibited an anisotropic melt phase, was substantially insoluble in pentafluorophenol at 60° C., and exhibited a melt endotherm at 285° C.

The resulting polymer while at 286° C. was melt spun through a spinneret having a diameter of 0.007 inch at a throughput rate of 0.14 gram/minute and was wound up at a rate of 114 meters per minute.

A section of the resulting as-spun fiber had a denier of 12.7 and exhibited the following single filament properties:

Tenacity (grams per denier) 5.2,
Tensile modulus (grams per denier) 502,
Elongation (percent) 1.4.

EXAMPLE 8

Example 3 was substantially repeated while employing different molar concentrations of the reactants. More specifically, the following reactants and catalyst were added to the flask:

(a) 15.33 grams of 6-acetoxy-2-naphthoic acid (0.066 mole),
(b) 51.2 grams of 4-acetoxy-4'-carboxybiphenyl (0.200 mole),
(c) 12.00 grams of 4-acetoxybenzoic acid (0.066 mole), and
(d) 0.01 gram sodium acetate catalyst.

Following purging and evacuating with dry argon, the flask was heated in an oil bath under a slow stream of argon.

Polymerization was conducted at 270° to 360° C. over 3 hours. Finally the contents of the flask while melt stirred were evacuated to 0.5 mm. Hg and heated at 360° C. for 20 minutes.

The resulting polymer was a pale cream color and opaque, exhibited an anisotropic melt phase, was substantially insoluble in pentafluorophenol at 60° C., and exhibited a melt endotherm at 320° C.

The resulting polymer was melt spun while at 330° C. at a throughput rate of 0.42 gram/minute and was wound up at a rate of 1137 meters per minute.

A section of the resulting as-spun fiber had a denier of 2.50 and exhibited the following single filament properties:

Tenacity (grams per denier) 8.6,
Tensile modulus (grams per denier) 592,
Elongation (percent) 1.8.

EXAMPLE 9

Example 3 was substantially repeated while employing different molar concentrations of the reactants. More specifically, the following reactants and catalyst were added to the flask:

(a) 24.15 grams of 6-acetoxy-2-naphthoic acid (0.105 mole),
(b) 38.4 grams of 4-acetoxy-4'-carboxybiphenyl (0.150 mole),
(c) 8.10 grams of 4-acetoxybenzoic acid (0.045 mole), and
(d) 0.07 gram of potassium acetate catalyst.

Following purging and evacuating with dry argon, the flask was heated in an oil bath under a slow stream of argon.

Polymerization was conducted at 250° to 340° C. over 3 hours. Finally the contents of the flask while melt stirred were evacuated to 0.5 mm. Hg and heated at 340° C. for 30 minutes.

The resulting polymer was pearly and opaque in appearance, exhibited an anisotropic melt phase, was substantially insoluble in pentafluorophenol at 60° C., and exhibited a melt endotherm at 303° C.

EXAMPLE 10

Example 3 was substantially repeated with the exception that the optional moiety III was omitted and the optional moieties IV and V were present. More specifically, the following reactants and catalyst were added to the flask:

(a) 34.5 grams of 6-acetoxy-2-naphthoic acid (0.150 mole),
(b) 38.4 grams of 4-acetoxy-4'-carboxybiphenyl (0.150 mole),
(c) 20.0 grams of hydroquinone diacetate (0.103 mole),
(d) 16.6 grams of terephthalic acid (0.100 mole), and
(e) 0.020 gram of potassium acetate catalyst.

Following purging and evacuating with dry argon, the flask was heated in an oil bath under a slow stream of argon.

Polymerization was conducted at 250° to 340° C. over 3 hours. At this point 27.0 ml. of acetic acid were collected. Finally the contents of the flask were evacuated to 0.13 mm. Hg and heated at 340° C. for 25 minutes.

The resulting polymer was a pale cream color and opaque, exhibited an anisotropic melt phase, following extraction with acetone to remove low molecular weight impurities exhibited an inherent viscosity of approximately 7.8 as determined in a pentafluorophenol solution of 0.1 percent by weight concentration at 60° C., and exhibited a melt endotherm at 256° C.

The polymer was melt spun through a spinneret having a diameter of 0.007 inch while at 285° C. at a throughput rate of 0.14 gram/minute and was wound up at a rate of 50 meters per minute.

A section of the resulting as-spun fiber had a denier of 10.7 and exhibited the following single filament properties:

Tenacity (grams per denier) 9.5,
Tensile modulus (grams per denier) 614,
Elongation (percent) 1.9.

EXAMPLE 11

To a 300 ml. three-neck round bottom flask equipped with a sealed paddle stirrer, gas inlet tube, and a distillation head connected to a condenser were added the following:

(a) 2.88 grams of 6-acetoxy-2-naphthoic acid (0.012 mole),
(b) 30.40 grams of 4-acetoxy-4'-carboxybiphenyl (0.12 mole), and
(c) 21.38 grams of 4-acetoxybenzoic acid (0.12 mole).

No catalyst was added at this stage. Following purging and evacuating with dry argon, the flask was heated in an oil bath under a slow stream of argon (0.15 liter/minute).

While stirring continued, the contents of the flask were heated to 260° C. and it was observed that the initial rate of distillation of acetic acid was very slow. After 10 minutes while heating at 260° C., the bath was raised to 290° C., was held at 290° C. for 40 minutes, was raised to 310° C., and was held at 310° C. for 1 hour. At this point in the polymerization reaction 7 mls. of acetic acid had been collected, and 0.01 gram of potassium acetate catalyst and 0.5 ml. of acetic acid were added to the flask. After another 30 minutes of heating at 310° C. the bath was riased to 330° C., and was held at 330° C. for a few minutes. It was then observed that the molten polymer in the flask showed a tendency to solidify, and the flask was next heated to 360° C. The flask was evacuated to 0.7 mm. of Hg and after 11 minutes of heating at 360° C. the melt rapidly became viscous. Finally the bath was raised to 370° C. and the melt which was opaque and pale in color began to solidify. After heating for a total of 36 minutes under a pressure of 0.7 mm., the flask was next filled with argon at atmospheric pressure and was allowed to cool.

The total yield of acetic acid was observed to be 8 mls. The resulting polymer was removed by breaking the flask and weighed 31.3 grams. The product was ground in a Wiley mill to a fine powder and was found to be insoluble in pentafluorophenol even at 90° C. Accordingly, it was impossible to determine the inherent viscosity of the product. When the polymer was subjected to differential scanning calorimetry (20° C./min. heating rate), it exhibited a melt endotherm at 327° C. The polymer melt was optically anisotropic.

The polymer while molten at a temperature of 361° C. was extruded through a single hole spinneret having a diameter of 0.007 inch at a throughput rate of 0.42 gram/minute. The as-spun filament was quenched in ambient air (i.e. at 72° F. and 65 percent relative humidity) prior to being wound up at a rate of 1786 meters/minute.

A section of the resulting as-spun polyester fiber had a denier of 2.34 and exhibited the following single filament properties:

Tenacity (grams per denier) 7.6,
Tensile modulus (grams per denier) 540,
Elongation (percent) 1.52.

Following heat treatment in a relaxed state it a current of dry nitrogen at 300° C. for 16 hours the following single filament properties were observed:

Tenacity (grams per denier) 10.1,
Tensile modulus (grams per denier) 761,
Elongation (percent) 1.4.

Although the invention has been described with preferred embodiments it is to be understood that variations and modifications may be employed without departing from the concept of the invention as defined in the following claims.

We claim:

1. A melt processable wholly aromatic polyester which is capable of forming an anisotropic melt phase at a temperature below 350° C. consisting essentially of moieties I and II and optionally also including moiety III and/or moieties IV and V which may include substitution of at least some of the hydrogen atoms present upon an aromatic ring wherein:

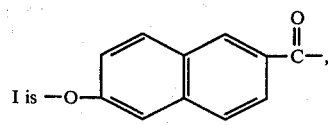

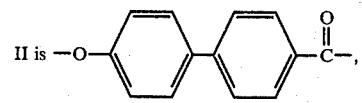

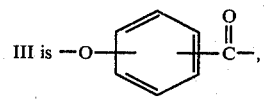

wherein the bonds illustrated are meta and/or para disposed,

IV is a dioxyaryl moiety of the formula —O—Ar—O— where Ar is a divalent radical comprising at least one aromatic ring, and V is a dicarboxyaryl moiety of the formula

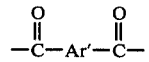

where Ar' is a divalent radical comprising at least one aromatic ring, and with said optional substitution if present being selected from the group consisting of an alkyl group of 1 to 4 carbon atoms, an alkoxy group of 1 to 4 carbon atoms, halogen, phenyl, and mixtures of the foregoing, and wherein moiety I is present in said wholly aromatic polyester in a concentration of approximately 4 to 65 mole percent, moiety II is present in a concentration of 20 to 65 mole percent, moiety III is present in a concentration of 0 to approximately 65 mole percent, and moiety IV is present in a concentration of 0 to approximately 25 mole percent, with the proviso that the total molar concentration of moieties I and II in said wholly aromatic polyester is approximately 50 to 100 mole percent.

2. A melt processable wholly aromatic polyester according to claim 1 which is capable of exhibiting a differential scanning calorimeter melting temperature at a temperature within the range of approximately 250° to 345° C.

3. A melt processable wholly aromatic polyester according to claim 1 wherein moieties I, II, III, IV and V are free of ring substitution.

4. A melt processable wholly aromatic polyester according to claim 1 wherein moieties IV and V are symmetrically disposed.

5. A melt processable wholly aromatic polyester according to claim 1 wherein moiety III is substantially absent and moieties IV and V are each present in a concentration of approximately 15 to 25 mole percent.

6. A melt processable wholly aromatic polyester according to claim 6 wherein the moieties IV and V are symmetrically disposed.

7. A melt processable wholly aromatic polyester according to claim 1 wherein the bonds of moiety III are para disposed.

8. A melt processable wholly aromatic polyester according to claim 1 wherein moiety III is p-oxybenzoyl moiety.

9. A melt processable wholly aromatic polyester according to claim 1 wherein moiety IV is a 1,4-dioxyphenylene moiety.

10. A melt processable wholly aromatic polyester according to claim 1 wherein moiety V is a terephthaloyl moiety.

11. A melt processable wholly aromatic polyester according to claim 1 which exhibits an inherent viscosity of at least 4 when dissolved in a concentration of 0.1 percent by weight in pentafluorophenol at 60° C.

12. A melt processable wholly aromatic polyester according to claim 1 which exhibits an inherent viscosity of approximately 4 to 15 when dissolved in a concentration of 0.1 percent by weight in pentafluorophenol at 60° C.

13. A fiber which has been melt spun from the wholly aromatic polyester of claim 1.

14. A film which has been melt extruded from the wholly aromatic polyester of claim 1.

15. A molded article comprising the wholly aromatic polyester of claim 1.

16. A molding compound comprising the wholly aromatic polyester of claim 1 which incorporates approximately 1 to 60 percent by weight of a solid filler and/or reinforcing agent.

17. A melt processable wholly aromatic polyester which is capable of forming an anisotropic melt phase at a temperature below 350° C. consisting essentially of moieties I and II and optionally also including moiety III and/or moieties IV and V which may include substitution of at least some of the hydrogen atoms present upon an aromatic ring wherein:

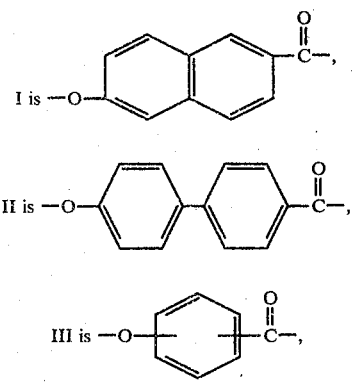

wherein the bonds illustrated are meta and/or para disposed

IV is a dioxyaryl moiety of the formula —O—Ar—O— where Ar is a divalent radical comprising at least one aromatic ring, and V is a dicarboxyaryl moiety of the formula

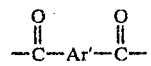

where Ar' is a divalent radical comprising at least one aromatic ring, and with said optional substitution if present being selected from the group consisting of an alkyl group of 1 to 4 carbon atoms, an alkoxy group of 1 to 4 carbon atoms, halogen, phenyl, and mixtures of the foregoing, and wherein moiety I is present in said wholly aromatic polyester in a concentration of approximately 20 to 60 mole percent, moiety II is present in a concentration of 20 to 60 mole percent, moiety III is present in a concentration of 0 to approximately 40 mole percent, and moiety IV is present in a concentration of 0 to approximately 25 mole percent, and moiety V is present in a concentration of 0 to approximately 25 mole percent, with the proviso that the total molar concentration of moieties I and II in said wholly aromatic polyester is approximately 50 to 100 mole percent.

18. A melt processable wholly aromatic polyester according to claim 17 which is capable of forming an anisotropic melt phase at a temperature below 325° C.

19. A melt processable wholly aromatic polyester according to claim 17 which is capable of exhibiting a differential scanning calorimeter melting temperature at a temperature within the range of approximately 250° to 345° C.

20. A melt processable wholly aromatic polyester according to claim 17 wherein moieties I, II, III, IV and V are free of ring substitution.

21. A melt processable wholly aromatic polyester according to claim 17 wherein moieties IV and V are symmetrically disposed.

22. A melt processable wholly aromatic polyester according to claim 17 wherein moiety III is substantially absent and moieties IV and V are each present in a concentration of approximately 15 to 25 mole percent.

23. A melt processable wholly aromatic polyester according to claim 22 wherein the moieties IV and V are symmetrically disposed.

24. A melt processable wholly aromatic polyester according to claim 17 wherein the bonds of moiety III are para disposed.

25. A melt processable wholly aromatic polyester according to claim 17 wherein moiety III is p-oxybenzoyl moiety.

26. A melt processable wholly aromatic polyester according to claim 17 wherein moiety IV is a 1,4-dioxyphenylene moiety.

27. A melt processable wholly aromatic polyester according to claim 17 wherein moiety V is a terephthaloyl moiety.

28. A melt processable wholly aromatic polyester according to claim 17 which exhibits an inherent viscosity of at least 4 when dissolved in a concentration of 0.1 percent by weight in pentafluorophenol at 60° C.

29. A melt processable wholly aromatic polyester according to claim 17 which exhibits an inherent viscosity of approximately 4 to 15 when dissolved in a concentration of 0.1 percent by weight in pentafluorophenol at 60° C.

30. A fiber which has been melt spun from the wholly aromatic polyester of claim 17.

31. A film which has been melt extruded from the wholly aromatic polyester of claim 17.

32. A molded article comprising the wholly aromatic polyester of claim 17.

33. A molding compound comprising the wholly aromatic polyester of claim 17 which incorporates approximately 1 to 60 percent by weight of a solid filler and/or reinforcing agent.

34. A melt processable wholly aromatic polyester which is capable of forming an anisotropic melt phase at a temperature below 350° C. which consists of moieties I and II which may include substitution of at least some of the hydrogen atoms present upon an aromatic ring wherein:

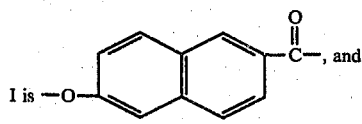

with said optional substitution if present being selected from the group consisting of an alkyl group of 1 to 4 carbon atoms, and alkoxy group of 1 to 4 carbon atoms, halogen, phenyl, and mixtures of the foregoing wherein moiety I is present in said wholly aromatic polyester in a concentration of approximately 35 to 65 mole percent, and moiety II is present in said wholly aromatic polyester in a concentration of approximately 35 to 65 mole percent.

35. A melt processable wholly aromatic polyester according to claim 34 which is capable of forming an anisotropic melt phase at a temperature below 325° C.

36. A melt processable wholly aromatic polyester according to claim 34 which is capable of exhibiting a differential scanning calorimeter melting temperature at a temperature within the range of approximately 300° to 345° C.

37. A melt processable wholly aromatic polyester according to claim 34 wherein moieties I and II are free of ring substitution.

38. A melt processable wholly aromatic polyester according to claim 34 wherein moiety I is present in a concentration of approximately 40 to 60 mole percent, and moiety II is present in a concentration of approximately 40 to 60 mole percent.

39. A fiber which has been melt spun from the wholly aromatic polyester of claim 34.

40. A film which has been melt extruded from the wholly aromatic polyester of claim 34.

41. A molded article comprising the wholly aromatic polyester of claim 34.

42. A molding compound comprising the wholly aromatic polyester of claim 34 which incorporates approximately 1 to 60 percent by weight of a solid filler and/or reinforcing agent.

43. A melt processable wholly aromatic polyester which is capable of forming an anisotropic melt phase at a temperature below 325° C. which consists of moieties I, II and III which may include substitution of at least some of the hydrogen atoms present upon an aromatic ring wherein:

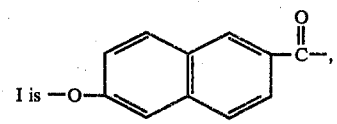

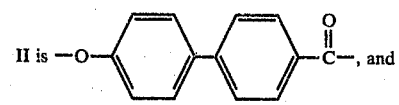

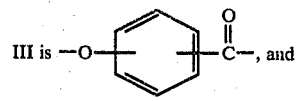

with said optional substitution if present being selected from the group consisting of an alkyl group of 1 to 4 carbon atoms, an alkoxy group of 1 to 4 carbon atoms, halogen, phenyl, and mixtures of the foregoing wherein moiety I is present in said wholly aromatic polyester in a concentration of approximately 20 to 60 mole percent, moiety II is present in a concentration of approximately 20 to 60 mole percent, and moiety III is present in a concentration of approximately 10 to 40 mole percent, with the proviso that the total molar concentration of moieties I and II in said wholly aromatic polyester is approximately 50 to 90 mole percent.

44. A melt processable wholly aromatic polyester according to claim 43 which is capable of forming an anisotropic melt phase at a temperature below 300° C.

45. A melt processable wholly aromatic polyester according to claim 43 which is capable of exhibiting a differential scanning calorimeter melting temperature at a temperature within the range of approximately 250° to 325° C.

46. A melt processable wholly aromatic polyester according to claim 43 wherein moieties I, II and III are free of ring substitution.

47. A melt processable wholly aromatic polyester according to claim 43 wherein moiety I is present in a concentration of approximately 20 to 60 mole percent, moiety II is present in a concentration of approximately 20 to 60 mole percent, and moiety III is present in a concentration of approximately 15 to 40 mole percent, with the proviso that the total molar concentration of moieties I and II in said wholly aromatic polyester is approximately 50 to 85 mole percent.

48. A fiber which has been melt spun from the wholly aromatic polyester of claim 43.

49. A film which has been melt extruded from the wholly aromatic polyester of claim 43.

50. A molded article comprising the wholly aromatic polyester of claim 43.

51. A molding compound comprising the wholly aromatic polyester of claim 43 which incorporates approximately 1 to 60 percent by weight of a solid filler and/or reinforcing agent.

* * * * *